(12) United States Patent
Patel

(10) Patent No.: US 12,520,292 B2
(45) Date of Patent: Jan. 6, 2026

(54) NETWORK BASED INTELLIGENT NEW RADIO CARRIER AGGREGATION ALGORITHM FOR ODD BANDWIDTHS

(71) Applicant: T-MOBILE INNOVATIONS LLC, Overland Park, KS (US)

(72) Inventor: Nishant Patel, Irvine, CA (US)

(73) Assignee: T-Mobile Innovations LLC, Overland Park, KS (US)

(*) Notice: Subject to any disclaimer, the term of this patent is extended or adjusted under 35 U.S.C. 154(b) by 728 days.

(21) Appl. No.: 17/963,041

(22) Filed: Oct. 10, 2022

(65) Prior Publication Data

US 2024/0121765 A1  Apr. 11, 2024

(51) Int. Cl.
*H04W 72/51* (2023.01)
*H04W 72/0453* (2023.01)
*H04W 8/24* (2009.01)

(52) U.S. Cl.
CPC ....... *H04W 72/0453* (2013.01); *H04W 72/51* (2023.01); *H04W 8/24* (2013.01)

(58) Field of Classification Search
CPC .................................................... H04W 72/51
USPC ......................................................... 370/329
See application file for complete search history.

(56) References Cited

U.S. PATENT DOCUMENTS

2009/0274096 A1* 11/2009 Fu .................. H04L 5/0053
                                                       370/328

* cited by examiner

*Primary Examiner* — Angel T Brockman
(74) *Attorney, Agent, or Firm* — SHOOK, HARDY & BACON L.L.P.; Elena K. McFarland

(57) ABSTRACT

Systems and methods are provided for providing intelligent new radio carrier aggregation via a telecommunication network includes a cell site including a carrier aggregation system communicatively coupled to a user device. The carrier aggregation system is structured to provide a device capability request, receive a device capability indicator corresponding to a spectrum of a telecommunication network responsive to the device capability request, determine a first carrier cell corresponding to a first portion of the spectrum and a secondary carrier cell corresponding to a secondary portion of the spectrum based on the device capability indicator, and assign the first carrier cell from a first edge to a second edge of the first portion of the spectrum and the secondary carrier cell from a third edge to a fourth edge of the secondary portion of the spectrum based on the determined first carrier cell and the secondary carrier cell.

20 Claims, 5 Drawing Sheets

NETWORK BASED INTELLIGENT NEW RADIO CARRIER AGGREGATION ALGORITHM FOR ODD BANDWIDTHS

SUMMARY

The present disclosure is directed, in part, to providing intelligent new radio carrier aggregation via a telecommunication network, substantially as shown in and/or described in connection with at least one of the figures, and as set forth more completely in the claims.

In aspects set forth herein, a device capability indicator corresponding to a spectrum of a telecommunication network is received. Typically, carrier aggregation is utilized to assign multiple frequency; bands to a user device. Operators may own more spectrum than the new radio carrier aggregation total bandwidth can support. However, here, a first carrier cell is assigned from a first edge to a second edge of a first portion of the spectrum and a secondary carrier cell is assigned from a third edge to a fourth edge of the secondary portion of the spectrum, which improves spectrum efficiency while eliminating spectrum waste and increasing user device data speed.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
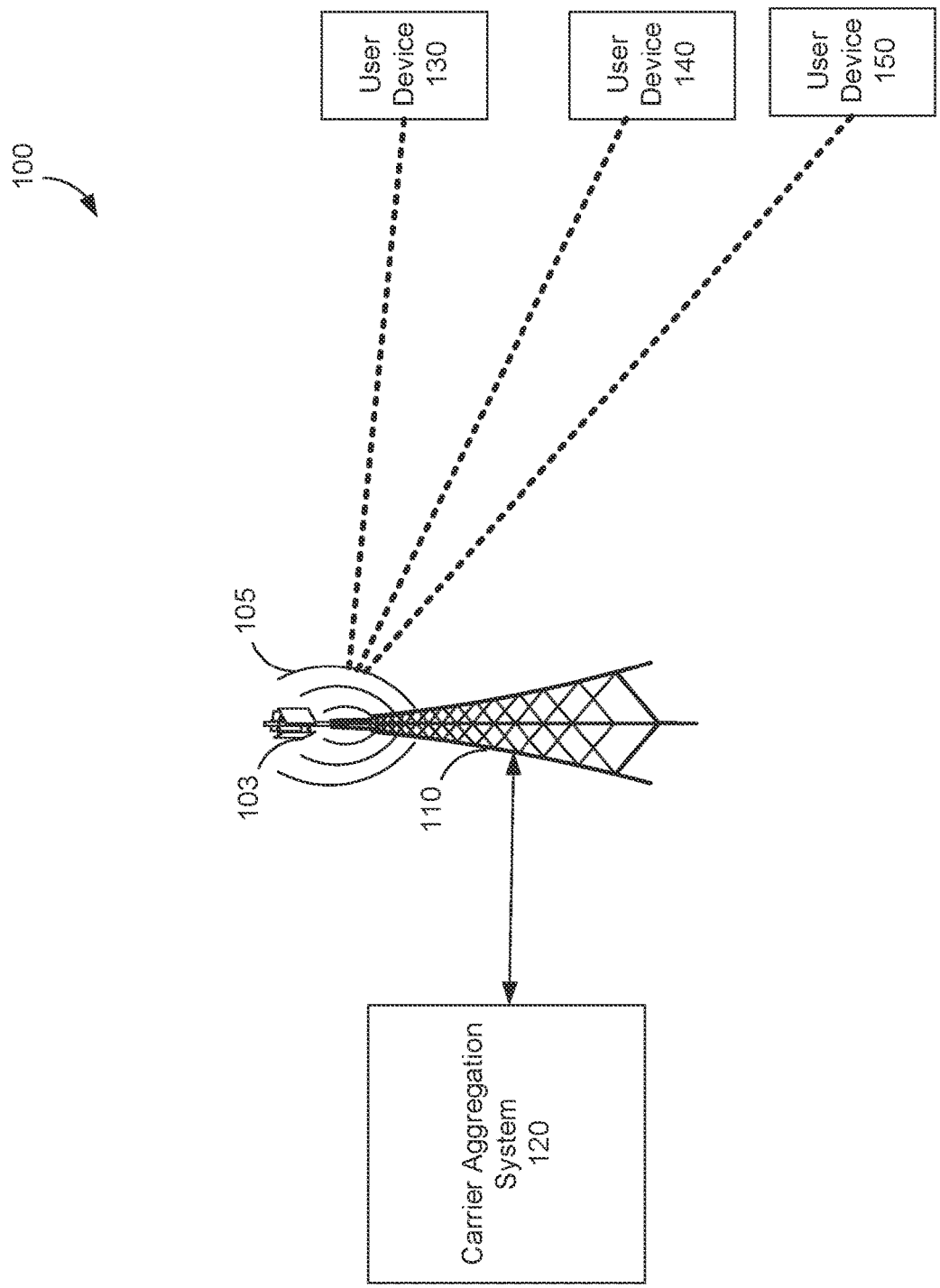
FIG. 1 depicts an example of a network environment in accordance with one or more embodiments.

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In certain aspects, methods are provided for providing intelligent new radio carrier aggregation via a telecommunication network (e.g., a 5G New Radio network or any other suitable network). A device capability indicator corresponding to a spectrum of a telecommunication network is received. A first carrier cell and a secondary carrier cell corresponding to a first portion of the spectrum and a secondary portion of the spectrum is determined based on the device capability indicator. A first carrier cell from a first edge to a second edge of the first portion of the spectrum and the secondary carrier cell from a third edge to a fourth edge of the secondary portion of the spectrum are assigned based on the determined first carrier cell and the secondary carrier cell.

Advantageously, providing methods and systems for providing intelligent new radio carrier aggregation by assigning carrier cells corresponding to portions of a spectrum improves spectrum efficiency while eliminating spectrum waste.

In one aspect, a method is provided for providing intelligent new radio carrier aggregation via a telecommunication network. The method includes receiving, by a carrier aggregation system communicatively coupled to a user device, a device capability indicator corresponding to a spectrum of a telecommunication network. The method also includes determining a first carrier cell corresponding to a first portion of the spectrum and a secondary carrier cell corresponding to a secondary portion of the spectrum based on the device capability indicator. The method further includes assigning the first carrier cell from a first edge to a second edge of the first portion of the spectrum and the secondary carrier cell from a third edge to a fourth edge of the secondary portion of the spectrum based on the determined first carrier cell and the secondary carrier cell.

In another aspect, a computer-readable storage media having computer-executable instructions embodied thereon is provided that, when executed by one or more processors, cause the processors to perform various steps. The processors are caused to receive, by a carrier aggregation system communicatively coupled to a user device, a device capability indicator corresponding to a spectrum of a telecommunication network. The processors are also caused to determine a first carrier cell corresponding to a first portion of the spectrum and a secondary carrier cell corresponding to a secondary portion of the spectrum based on the device capability indicator. The processors are further caused to assign the first carrier cell from a first edge to a second edge of the first portion of the spectrum and the secondary carrier cell from a third edge to a fourth edge of the secondary portion of the spectrum based on the determined first carrier cell and the secondary carrier cell.

In yet another aspect, a system is provided for providing intelligent new radio carrier aggregation via a telecommunication network. The system includes a cell site including a carrier aggregation system communicatively coupled to a user device. The carrier aggregation system provides a device capability request. The carrier aggregation system receives a device capability indicator corresponding to a spectrum of a telecommunication network responsive to the device capability request. The carrier aggregation system also determines a first carrier cell corresponding to a first portion of the spectrum and a secondary carrier cell corresponding to a secondary portion of the spectrum based on the device capability indicator. The carrier aggregation system further assigns the first carrier cell from a first edge to a second edge of the first portion of the spectrum and the secondary carrier cell from a third edge to a fourth edge of the secondary portion of the spectrum based on the determined first carrier cell and the secondary carrier cell.

Throughout this disclosure, several acronyms and shorthand notations are used to aid the understanding of certain concepts pertaining to the associated system and methods. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and non-removable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 400 shown in FIG. 4. Computer storage media does not comprise a signal per se.

The terms "network" and "telecommunication network" may be used interchangeably herein to refer to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

The terms "user equipment," "UE," and "user device" are used interchangeably to refer to a device employed by an end-user that communicates using a network. LTE generally includes one or more antenna coupled to a radio for exchanging (e.g., transmitting and receiving) transmissions with a nearby base station, via an antenna array of the base station. In embodiments, the UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. The UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE, that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive NEMO, 3G, 4G, 5G, and/or 802.11 protocols and techniques.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE. 5G, mMIMO) as discussed hereinafter.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RE), infrared, and other wireless media. Combinations of any of the above also may be included within the scope of computer-readable media.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 provides service to one or more user devices 130, 140, and 150. In some embodiments, the network environment 100 may be a telecommunication network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. Those devices and components may provide connectivity in a variety of implementations. In addition the network environment 100 may be utilized in a variety of manners, such as a single network, multiple networks, or as a network of networks, but, ultimately, is shown as simplified as possible to avoid the risk of confusing other aspects of the present disclosure.

The network environment 100 may include or otherwise may be accessible through one or more cell sites 110. The cell site may include one or more antennas, base transmitter stations, radios, transmitter/receivers, digital signal processors, control electronics, GPS equipment, power cabinets or power supply, base stations, charging stations, etc. such that the cell site (e.g., the cell site 110) may provide a communication link between the one or more user devices 130, 140, and 150 and other components, systems, equipment, and/or devices of the network environment 100. The base station and/or a computing device (e.g., whether local or remote) associated with the base station may manage or otherwise control the operations of components of the cell site.

In some embodiments, the cell site 110 may be operable in a non-stand alone (NSA) mode. In the non-stand alone mode the network environment 100 may take the form of, for example, an E-UTRAN New Radio-Dual Connectivity (EN-DC) network. In an EN-DC network, a user device (e.g., the user device 130, 140, and/or 150) may connect to or otherwise access a 4G, LTE, or any other suitable network simultaneously. In the stand alone mode, the network environment 100 may take the form of a 5G network or any other suitable network.

In some embodiments, the network environment 100 may include a carder aggregation system (e the carrier aggregation system 120). The carrier aggregation system may include one or more nodes communicatively coupled to the user device(s) 130, 140, and/or 150 such that the carder aggregation system may be structured to transmit to and receive requests and/or data from one or more user devices. The one or more nodes may include an Evolved Node B (e.g., eNodeB or eNB), a Next Generation Node B (e.g., gNodeB or gNB), a combination thereof, or any other suitable node structured to communicatively couple to the user device(s) 130, 140, and/or 150.

In some embodiments, the user device 130, 140, and/or 150 may take the form of a wireless or mobile device capable of communication via the network environment 100. For example, the user device 130 may take the form of a mobile device capable of communication via a telecommunication network such as, but not limited to, a wireless telecommunication network. In this regard, the user device may be any mobile computing device that communicates by way of a network, for example, a 3G, CDMA, 4G, LIE, WiMAX, 5G or any other type of network.

In some embodiments, the network environment 100 may be structured to connect subscribers to a service provider or a plurality of service providers. Alternatively or additionally, the network environment 100 may be associated with a specific telecommunication provider that provides services (e.g. LTE, voice, location, etc.) to one or more user devices 130, 140, and/or 150. For example, the user devices 130, 140, and 150 may be subscribers to a telecommunication service provider, in which the user devices 130, 140, and 150 are registered or subscribed to receive voice and data services over the network environment 100. The network environment 100 may include any communication network providing voice and/or data service(s), such as, for example, a 1× circuit voice, a 3G network (e.g., CDMA, CDMA 2000, WCDMA, GSM, UMTS, a 4G network (LIE, WiMAX, HSDPA), or a 5G network.

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1, It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2A:
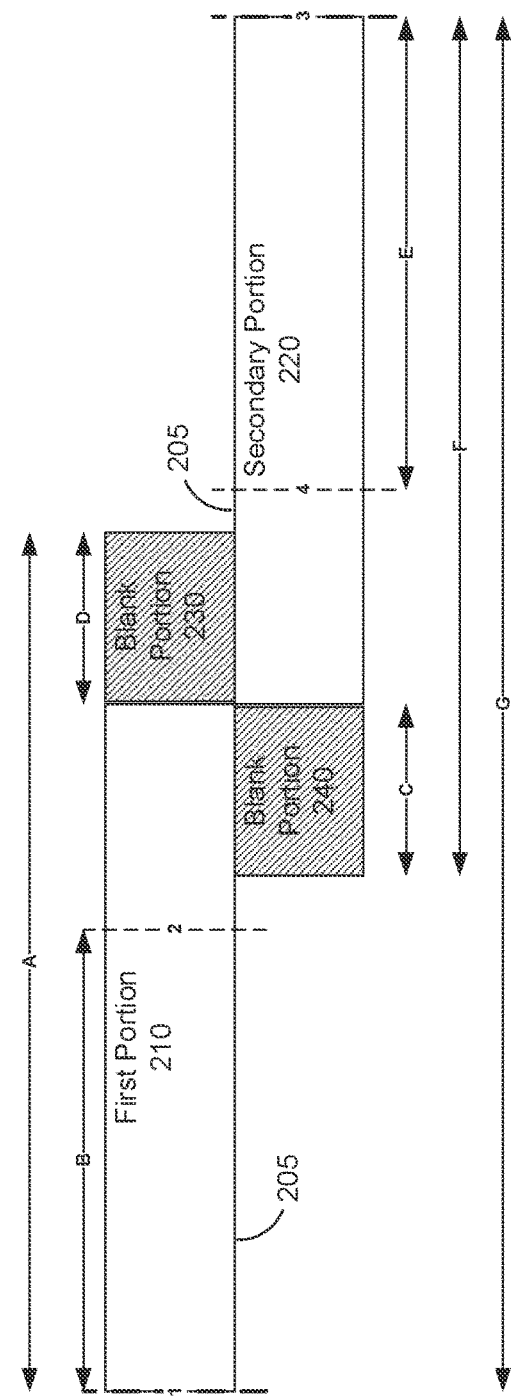
FIG. 2A is a diagram of a network environment including a first portion of a spectrum and a secondary portion of the spectrum in accordance with an example embodiment.
Figure 2B:
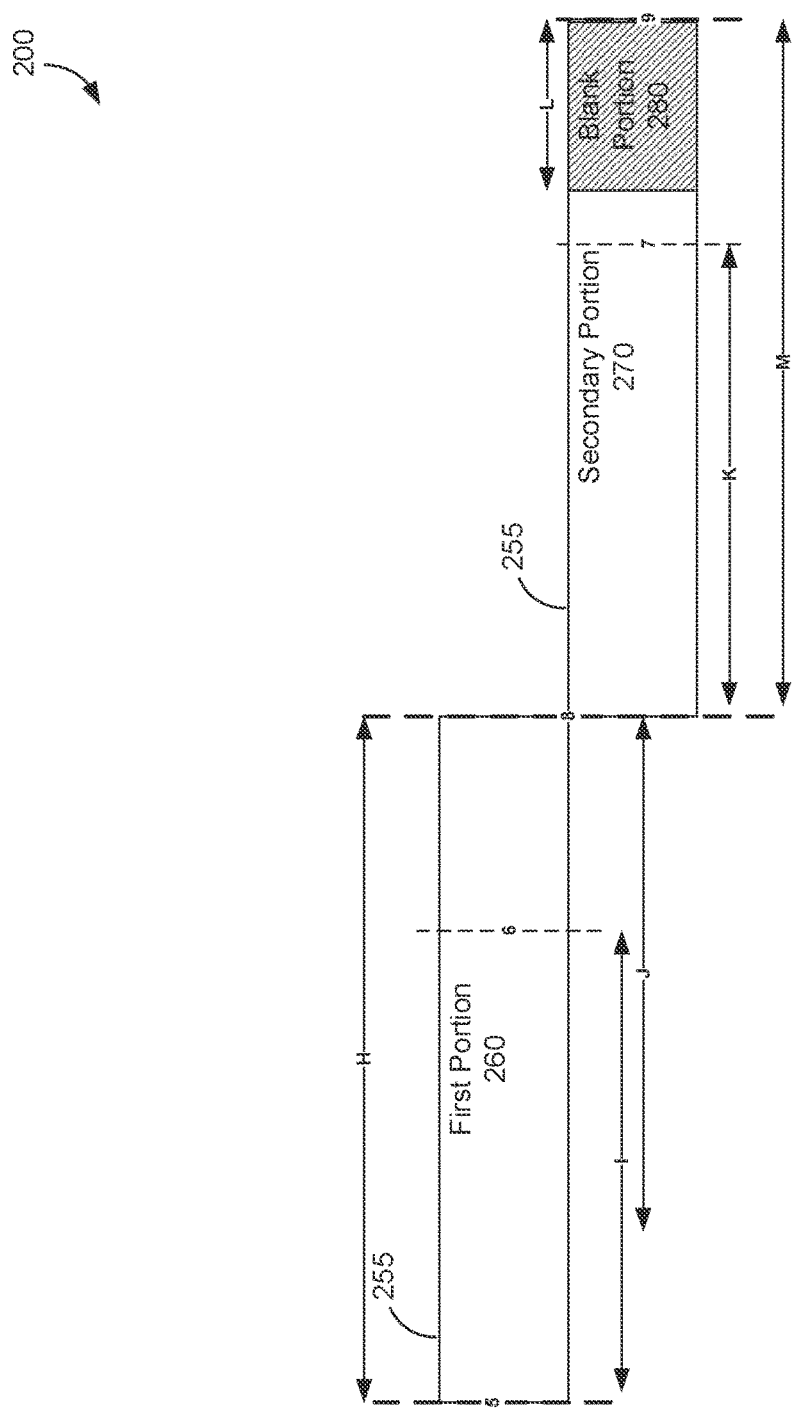
FIG. 2B is a diagram of a network environment including a first portion of a spectrum and a secondary portion of the spectrum in accordance with an example embodiment.

FIGS. 2A and 2B are diagrams of the network environment 200 (e.g., a telecommunication network such as, but not limited to, a wireless telecommunication network) according to an example embodiment. In the present embodiment, the network environment 200 includes the spectrum 205 and 255, one or more portions 210, 220, 260, and 270 of the spectrum(s), and one or more blank portions 230, 240, and 280. Although some of the components in the network environment 200 are depicted as single components, in some embodiments, the network environment 200 may include a plurality of such components from 1 to N.

In some examples, the carrier aggregation system (e.g., a gNodeB, new radio carrier aggregation system, etc.) may receive a device capability indicator corresponding to the spectrum (e.g., the spectrum 205) of a telecommunication network. The device capability indicator may be a value or other indicator that identifies the maximum combination of bandwidth that the user device can support. For example, the device capability indicator may include a value of 190 MHz the user device can support. The device capability indicator may be provided responsive to the device capability request. In some examples, the spectrum may include one or more blank portions 230, 240. The blank portion may indicate one or more areas of overlap between portions of the spectrum. A blank portion (e.g., a blanking portion, PRB blanking, etc.) may be, for example, 3 MHz or any other suitable value.

In some embodiments, the one or more user devices (e.g., the user devices 130, 140, and/or 150) may be communicatively coupled to the carrier aggregation system 120 (e.g., gNodeB or eNodeB) such that the carrier aggregation system 120 may transmit, broadcast, or otherwise provide a device capability request to the one or more user devices. In some embodiments, the carrier aggregation system 120 (e.g., a gNodeB) may be communicatively coupled to the user device(s) such that any user device within a geographic area may receive the device capability request provided by the carrier aggregation system 120. In some embodiments, the user device(s) 130, 140, 150 may be connected, via a Radio Resource Control (RRC) protocol, to the carrier aggregation system 120. In some examples, the carrier aggregation system 120 may transmit, broadcast, or otherwise provide the device capability request in real-time, and/or in near real-time. Alternatively or additionally, the user device 130, 140, and/or 150 may retrieve the device capability request from the carrier aggregation system 120.

The carrier aggregation system 120 may determine a first carrier cell corresponding to a first portion 210 (e.g., a first frequency band and/or frequency block) of the spectrum 205 and a secondary carrier cell and corresponding to a secondary portion 220 (e.g., a subsequent frequency band and/or frequency block) of the spectrum 205 based on the device capability indicator (e.g., 190 MHz). A carrier may correspond to one or more carrier cells. As used herein, the term "carrier cell" may be used to refer to a cell (e.g., pCell, sCell, or any other suitable cell) that may correspond to one or more carriers. In some embodiments, the first carrier cell may include at least one of a pCell or sCell. Alternatively or additionally, the secondary carrier cell may include at least one of a pCell or sCell.

The carrier aggregation system 120 may determine that based on the device capability indicator (e.g., the 190 MHz the user device can support), the first portion 210 (e.g., 100 MHz) of the bandwidth A may correspond to the first carrier cell (e.g., pCell of 100 mhz). The carrier aggregation system 120 may determine that based on the device capability indicator (e.g., 190 MHz the user device can support), the secondary portion 220 (e.g., 90 MHz) of the bandwidth F may correspond to the secondary carrier cell (e.g., sCell of 90 MHz).

In some examples, the first portion 210 and/or the secondary portion 220 may be adjacent to one or more blank portions 230, 240. In some embodiments, as shown in FIG. 2B, the first portion 260 of the spectrum 255 and the secondary portion 270 of the spectrum 255 may meet at an adjacent edge 8. As used here, the term "edge" may be used to refer to a boundary of a spectrum (e.g., a portion of the spectrum). In further embodiments, the blank portion 280 may be adjacent to a single portion (e.g., the secondary portion 270) of the spectrum 255 at a distance along the bandwidth L.

Advantageously, the data rate of the user device(s) (e.g., the user device 130) increases as more portions (e.g., frequency bands and/or frequency blocks) are allocated to the user device(s). In some examples, the carrier may, for example, provide higher downlink data speed to the user device(s) due to wider channel bandwidth, higher uplink data speed to the user device(s) due to wider channel bandwidth and less utilization of resource blocks (RBs), beamforming, etc.

The carrier aggregation system may assign the first carrier cell from a first edge to a second edge of the first portion of the spectrum and the secondary carrier cell from a third edge to a fourth edge of the secondary portion of the spectrum based on the determined first carrier cell and the secondary carrier cell. For example, the carrier aggregation system 120 may assign the first carrier cell (e.g., the pCell) from a first edge 1 (e.g., 2500 MHz) to end of bandwidth A (e.g., 2600 MHz) using Portion 210 and Portion 230 of the spectrum 205 along the bandwidth B and the secondary carrier cell (e.g., the sCell) from a third edge 3 (e.g., 2694 MHz) to a fourth edge 4 (e.g., 2604 MHz) of the secondary portion 220 of the spectrum 205 along the bandwidth E based on the determined first carrier cell and the secondary carrier cell as illustrated in FIG. 2A.

In some embodiments, the carrier aggregation system 120 may assign the first carrier cell (e.g., the sCell) from a first edge 5 (e.g., 2500 MHz) to a second edge 6 (e.g., 2590 MHz) of the first portion 260 of the spectrum 255 along the bandwidth I and the secondary carrier cell (e.g., the pCell) from a third edge 7 (e.g., 2600 MHz) to a fourth edge 8 (e.g., 2694 MHz) of the secondary portion 270 of the spectrum 255 along the bandwidth K based on the determined first carrier cell and the secondary carrier cell as illustrated in FIG. 2B.

Advantageously, assigning carrier cells corresponding to portions of a spectrum intelligently aggregates spectrum bandwidth based on the carrier which improves spectrum efficiency, eliminates spectrum waste, and increases user device data speed.

In such examples, the blank portion 280 along the bandwidth L may include or otherwise take the form of, for example, 6 MHz. As illustrated, the blank portion 280 may be adjacent to a single portion, the secondary portion 270, of the spectrum 255.

Figure 3:
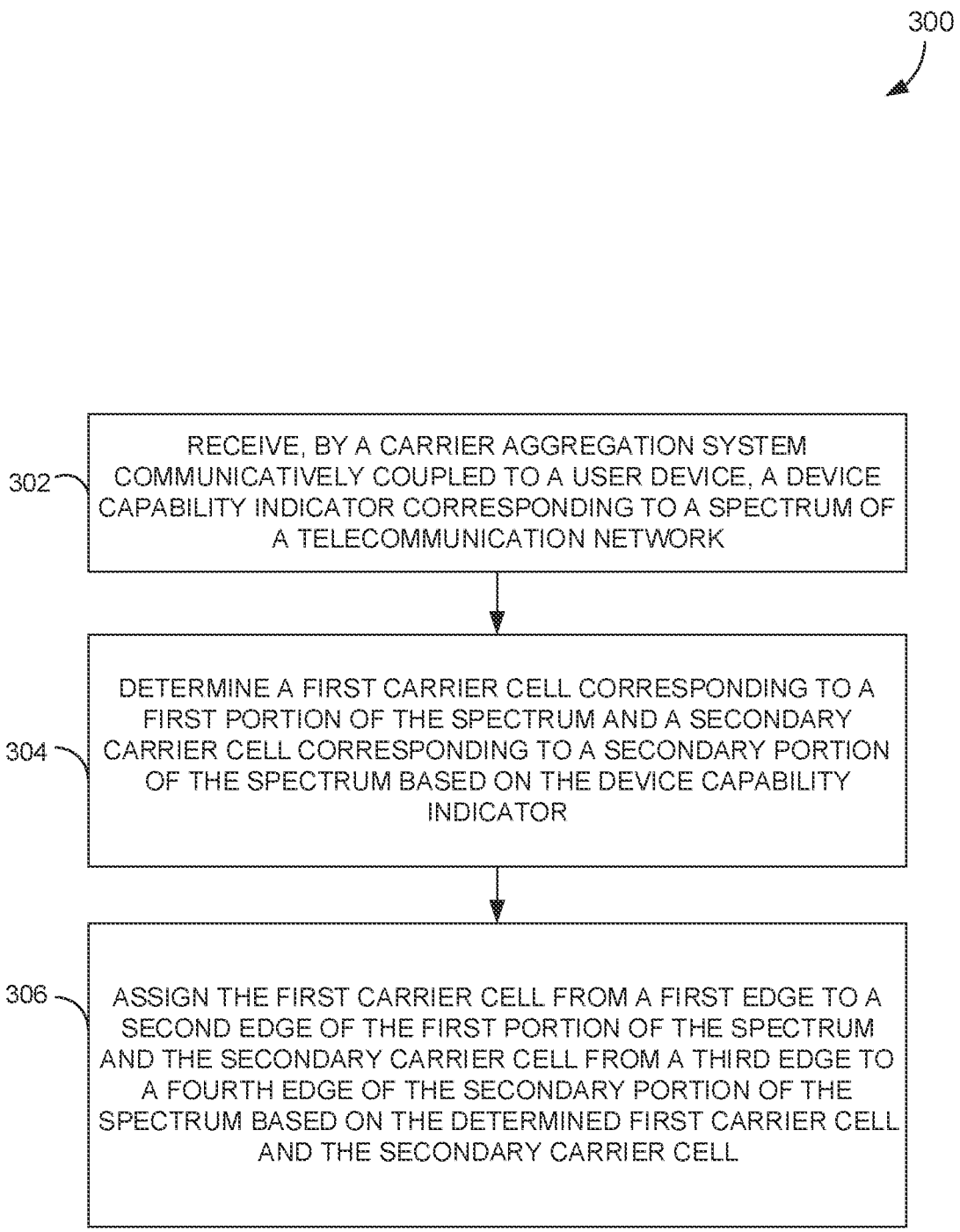
FIG. 3 depicts a flowchart of an exemplary method for providing intelligent new radio carrier aggregation in accordance with an example embodiment.

FIG. 3 depicts a flow diagram of an exemplary method 300 for providing intelligent new radio carrier aggregation in accordance with implementations of the present disclosure. Initially at block 302 a device capability indicator (e.g., a value or other indicator that identifies the maximum combination of bandwidth that the user device can support) corresponding to a spectrum of a telecommunication network is received by a carrier aggregation system. The spectrum may include one or more blank portions that may indicate one or more areas of overlap between portions of the spectrum.

At block 304, a first carrier cell and a secondary carrier cell corresponding to a first portion of the spectrum and a secondary portion of the spectrum is determined based on the device capability indicator. In some embodiments, the first carrier cell and/or the secondary carrier cell may include at least one of a pCell or sCell. The carrier aggregation system 120 may determine that based on the device capability indicator (e.g., the 190 MHz the user device can support), the first portion may correspond to the first carrier cell (e.g., pCell of 100 mhz) and the secondary portion may correspond to the secondary carrier cell (e.g., sCell of 90 MHz). In some examples, the one or more portions of the spectrum may be adjacent to one or more blank portions.

At block 306, the first carrier cell from a first edge to a second edge of the first portion of the spectrum and the secondary carrier cell from a third edge to a fourth edge of the secondary portion of the spectrum are assigned based on the determined first carrier cell and the secondary carrier cell. In some embodiments, the carrier aggregation system may assign the first carrier cell (e.g., the pCell) from the first edge to a second edge of the first portion of the spectrum along a first bandwidth. In further embodiments, the carrier aggregation system may assign the secondary carrier cell (e.g., the sCell) from a third edge to a fourth edge of the secondary portion of the spectrum along a second bandwidth.

Figure 4:
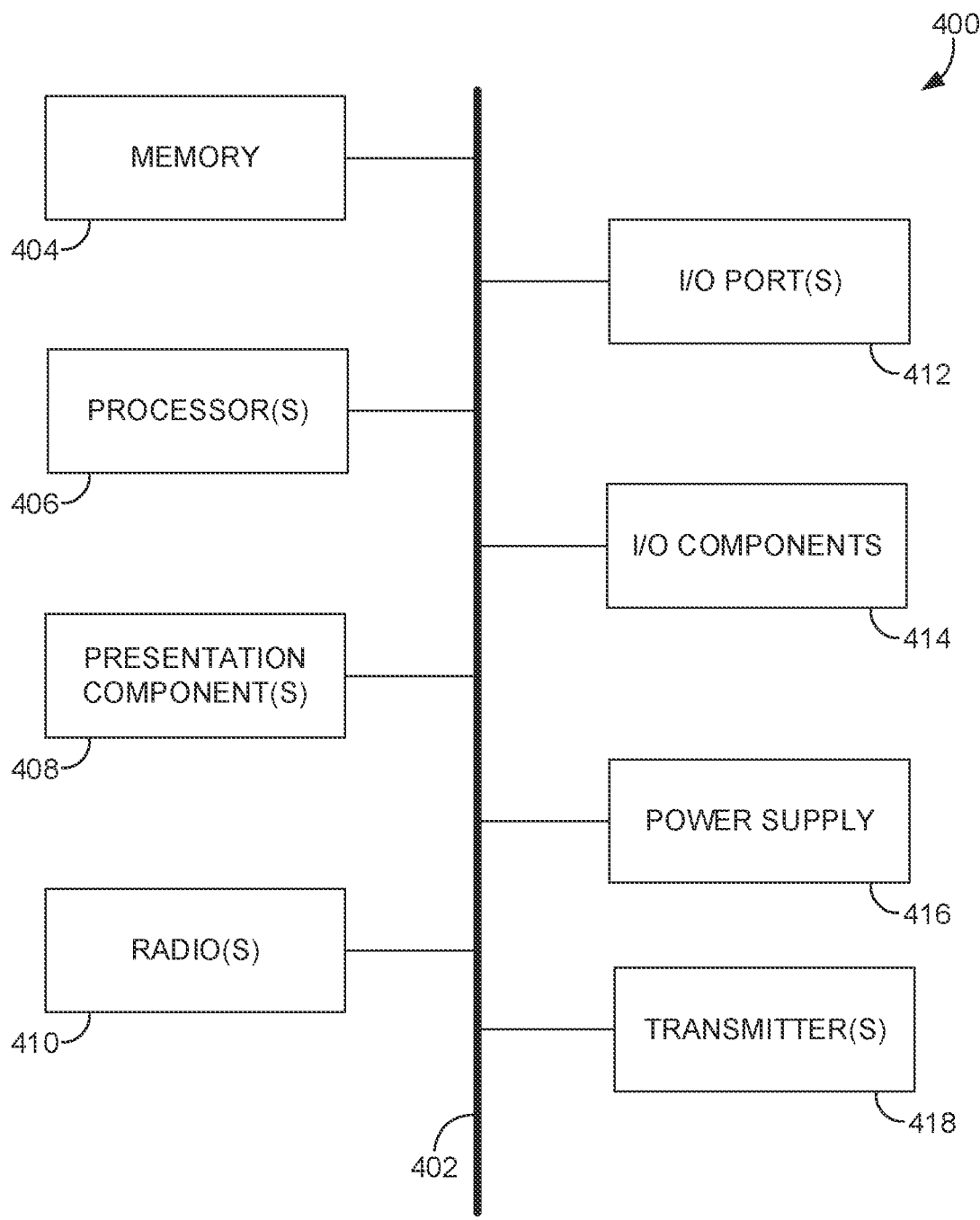
FIG. 4 depicts an exemplary computing device suitable for use in implementations of aspects herein.

Referring to FIG. 4, a block diagram of an example of a computing device 400 suitable for use in implementations of the technology described herein is provided. In particular, the exemplary computer environment is shown and designated generally as computing device 400. Computing device 400 is but one example of a suitable computing environment and is not intended to suggest any limitation as to the scope of use or functionality of the invention. Neither should computing device 400 be interpreted as having any dependency or requirement relating to any one or combination of components illustrated. In aspects, the computing device 400 may be a base station. In another embodiment, the computing device 400 may be UE capable of two-way wireless communications with an access point. Some non-limiting examples of the computing device 400 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 4, computing device 400 includes a bus 402 that directly or indirectly couples various components together. The bus 402 may directly or indirectly one or more of memory 404, processor(s) 406, presentation component(s) 408 (if applicable), radio(s) 410, input/output (I/O) port(s) 412, input/output WO) component(s) 414, power supply 416, and/or transmitter(s) 418. Although the components of FIG. 4 are shown with lines for the sake of clarity, in reality, delineating various components is not so clear, and metaphorically, the lines would more accurately be grey and fuzzy. For example, one may consider a presentation component(s) 408 such as a display device to be one of I/O components 414. Also, the processor(s) 406 may include memory 404, in another example. The present disclosure hereof recognizes that such is the nature of the art, and reiterates that FIG. 4 is merely illustrative of an example of a computing device 400 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 404 may take the form of memory components described herein. Thus, further elaboration will not be provided here, but it should be noted that memory 404 may include any type of tangible medium that is capable of storing information, such as a database or data store. A database or data store may be any collection of records, files, or information encoded as electronic data and stored in memory 404, for example. In one embodiment, memory 404 may include a set of embodied computer-readable and executable instructions that, when executed, facilitate various functions or elements disclosed herein. These embodied instructions will variously be referred to as "instructions" or an "application" for short.

Processor(s) 406 may be multiple processors that receive instructions and process them accordingly. Presentation component(s) 408, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 410 represents one or more radios that facilitate communication with a wireless telecommunication network. For example, radio(s) 410 may be connected to one or more antenna elements through a physical path. Illustrative wireless telecommunications technologies include CDMA, GPRS, TDMA, GSM, and the like. Radio(s) 410 might additionally or alternatively facilitate other types of wireless communications including Wi-Fi, WiMAX, 3G, 4G, LIE, mMIMO, 5G, 6G, NR, VoLTE and/or other VoIP communications. As can be appreciated, in various embodiments, radio(s) 410 may be configured to concurrently support multiple technologies, as previously discussed herein. As such, each of many radio(s) 410 may be used to separately control portions of an antenna array, for example, where at least one portion utilizes a distinct technology relative to another portion in the same antenna array or at the same base station or cell site. A wireless telecommunication network might include an array of devices, which are not shown so as to not obscure more relevant aspects of the invention. Components such as a base station, a communications tower, or even access points (as well as other components) can provide wireless connectivity in some embodiments.

The input/output (I/O) ports 412 may take a variety of forms. Exemplary I/O ports 412 may include a USB jack, a stereo jack, an infrared port, a firewire port, other proprietary communications ports, and the like. Input/output (I/O) components 414 may comprise keyboards, microphones, speakers, touchscreens, and/or any other item usable to directly or indirectly input data into the computing device 400.

Power supply 416 may include batteries, fuel cells, and/or any other component that may act as a power source to supply power to the computing device 400 or to other network components, including through one or more electrical connections or couplings. Power supply 416 may be configured to selectively supply power to different components independently and/or concurrently.

Finally, regarding FIGS. 1 through 4, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional components) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and sub-combinations are of utility and may be employed without reference to other features and sub-combinations and are contemplated within the scope of the claims.

The invention claimed is:

1. A method for providing intelligent new radio carrier aggregation via a telecommunication network, the method comprising:
   receiving, by a carrier aggregation system communicatively coupled to a user device, a device capability indicator corresponding to a spectrum of a telecommunication network;
   determining a first carrier cell corresponding to a first portion of the spectrum and a secondary carrier cell corresponding to a secondary portion of the spectrum based on the device capability indicator; and
   assigning the first cattier cell from a first edge to a second edge of the first portion of the spectrum and assigning the secondary carrier cell from a third edge to a fourth edge of the secondary portion of the spectrum based on the determined first carrier cell and the secondary carrier cell.

2. The method of claim 1, wherein the first carrier cell comprises at least one of a pCell or sCell.

3. The method of claim 1, wherein the secondary carrier cell comprises at least one of a pCell or sCell.

4. The method of claim 1, wherein the spectrum comprises one or more blank portions.

5. The method of claim 1, wherein the first portion of the spectrum and the secondary portion of the spectrum meet at an adjacent edge.

6. The method of claim 1, wherein the carrier aggregation system comprises a gNodeB or an eNodeB.

7. The method of claim 1, wherein the telecommunication network comprises a cell site.

8. The method of claim 7, wherein the cell site is operable based on at least one of a 4G network, E-UTRAN New Radio-Dual Connectivity (EN-DC) network, or 5G network.

9. The method of claim 1, wherein the cell site comprises the carrier aggregation system.

10. Computer-readable storage media having computer-executable instructions embodied thereon that, when executed by one or more processors, cause the one or more processors to:
    receive, by a carrier aggregation system communicatively coupled to a user device, a device capability indicator corresponding to a spectrum of a telecommunication network;
    determine a first carrier cell corresponding to a first portion of the spectrum and a secondary carrier cell corresponding to a secondary portion of the spectrum based on the device capability indicator; and
    assign the first carrier cell from a first edge to a second edge of the first portion of the spectrum and the secondary carrier cell from a third edge to a fourth edge of the secondary portion of the spectrum based on the determined first carrier cell and the secondary carrier cell.

11. The computer-readable storage media of claim 10, wherein the first carrier cell comprises at least one of a pCell or sCell, and wherein the secondary carrier cell comprises at least one of the pCell or the sCell.

12. The computer-readable storage media of claim 10, wherein the device capability indicator comprises a value that identifies a maximum combination of bandwidth.

13. The computer-readable storage media of claim 10, wherein the first portion of the spectrum and the secondary portion of the spectrum meet at an adjacent edge.

14. The computer-readable storage media of claim 10, wherein the spectrum comprises one or more blank portions.

15. A system for providing intelligent new radio carrier aggregation via a telecommunication network, the system comprising:

a cell site comprising a carrier aggregation system communicatively coupled to a user device, the carrier aggregation system structured to:

provide a device capability request;

receive a device capability indicator corresponding to a spectrum of a telecommunication network responsive to the device capability request;

determine a first carrier cell corresponding to a first portion of the spectrum and a secondary carrier cell corresponding to a secondary portion of the spectrum based on the device capability indicator; and assign the first carrier cell from a first edge to a second edge of the first portion of the spectrum and the secondary carrier cell from a third edge to a fourth edge of the secondary portion of the spectrum based on the determined first carrier cell and the secondary carrier cell.

16. The system of claim 15, wherein the first carrier cell comprises at least one of a pCell or sCell, and wherein the secondary carrier cell comprises at least one of the pCell or the sCell.

17. The system of claim 15, wherein the device capability indicator comprises a value that identifies a maximum combination of bandwidth.

18. The system of claim 15, wherein a blank portion is adjacent to a single portion of the spectrum.

19. The system of claim 15, wherein the spectrum comprises one or more blank portions.

20. The system of claim 15, wherein the device capability indicator comprises a maximum combination of bandwidth.

* * * * *